(12) United States Patent
Kao et al.

(10) Patent No.: US 8,244,405 B2
(45) Date of Patent: Aug. 14, 2012

(54) ELECTRICAL MONITORING AND CONTROL SYSTEM

(75) Inventors: Imin Kao, Stonybrook, NY (US); Brenda Pomerance, New York, NY (US); Robert P. Wong, Huntington, NY (US)

(73) Assignee: BSafe Electrix, Inc.

( * ) Notice: Subject to any disclaimer, the term of this patent is extended or adjusted under 35 U.S.C. 154(b) by 250 days.

(21) Appl. No.: 12/380,460

(22) Filed: Feb. 27, 2009

(65) Prior Publication Data

US 2009/0222142 A1    Sep. 3, 2009

Related U.S. Application Data

(60) Provisional application No. 61/067,693, filed on Feb. 29, 2008.

(51) Int. Cl.
*G05D 11/00*    (2006.01)

(52) U.S. Cl. .......................................... 700/286; 361/42

(58) Field of Classification Search .................. 700/286; 361/42; 324/527
See application file for complete search history.

(56) References Cited

U.S. PATENT DOCUMENTS

| | | | | |
|---|---|---|---|---|
| 4,870,528 A | * | 9/1989 | Harford | 361/56 |
| 4,870,534 A | * | 9/1989 | Harford | 361/58 |
| 6,373,257 B1 | * | 4/2002 | Macbeth et al. | 324/536 |
| 6,426,634 B1 | * | 7/2002 | Clunn et al. | 324/536 |
| 6,532,139 B2 | * | 3/2003 | Kim et al. | 361/42 |
| 6,608,741 B1 | * | 8/2003 | Macbeth | 361/42 |
| 6,839,208 B2 | * | 1/2005 | Macbeth et al. | 361/42 |
| 6,876,528 B2 | * | 4/2005 | Macbeth | 361/42 |
| 6,948,846 B2 | * | 9/2005 | Engel | 374/141 |
| 7,253,637 B2 | | 8/2007 | Dvorak | |
| 7,362,552 B2 | | 4/2008 | Elms | |
| 7,499,250 B2 | | 3/2009 | Zhang | |
| 2001/0033469 A1 | * | 10/2001 | Macbeth et al. | 361/42 |
| 2002/0008950 A1 | * | 1/2002 | Kim et al. | 361/42 |
| 2003/0058596 A1 | * | 3/2003 | MacBeth | 361/93.5 |
| 2004/0100274 A1 | * | 5/2004 | Gloster et al. | 324/536 |
| 2005/0089079 A1 | * | 4/2005 | Engel | 374/141 |

* cited by examiner

*Primary Examiner* — Mohammad Ali
*Assistant Examiner* — Anthony Whittington
(74) *Attorney, Agent, or Firm* — Thomas A. O'Rourke; Bodner & O'Rourke, LLP

(57) ABSTRACT

A system for monitoring and controlling the electrical infrastructure of a building includes at least one sensor for sensing an operating characteristic in the building, and a processor for receiving information from the at least one sensor and predicting a future operating characteristic.

24 Claims, 10 Drawing Sheets

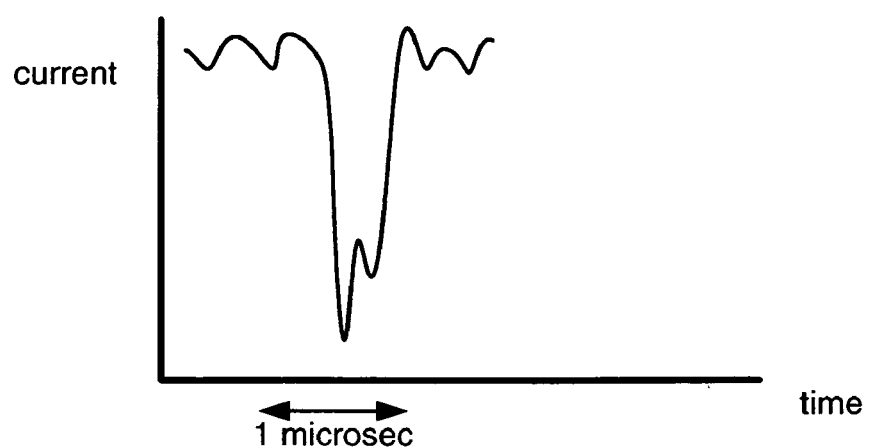
Fig. 2
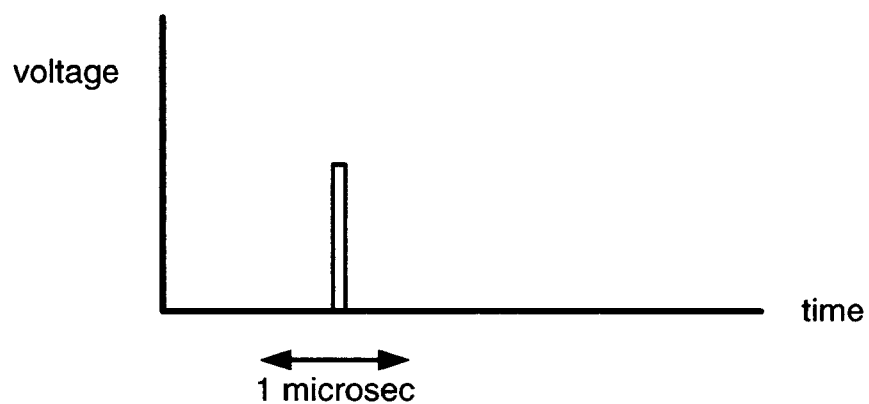
Fig. 3
Fig. 4
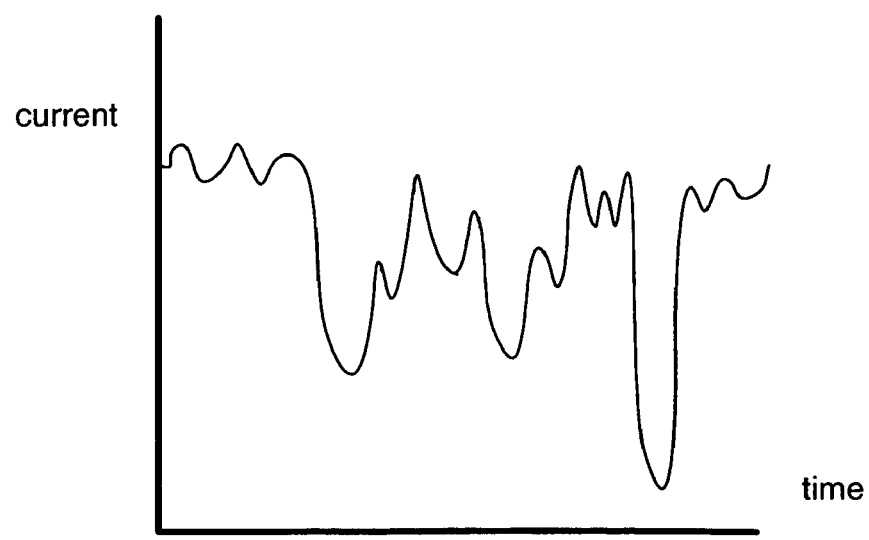

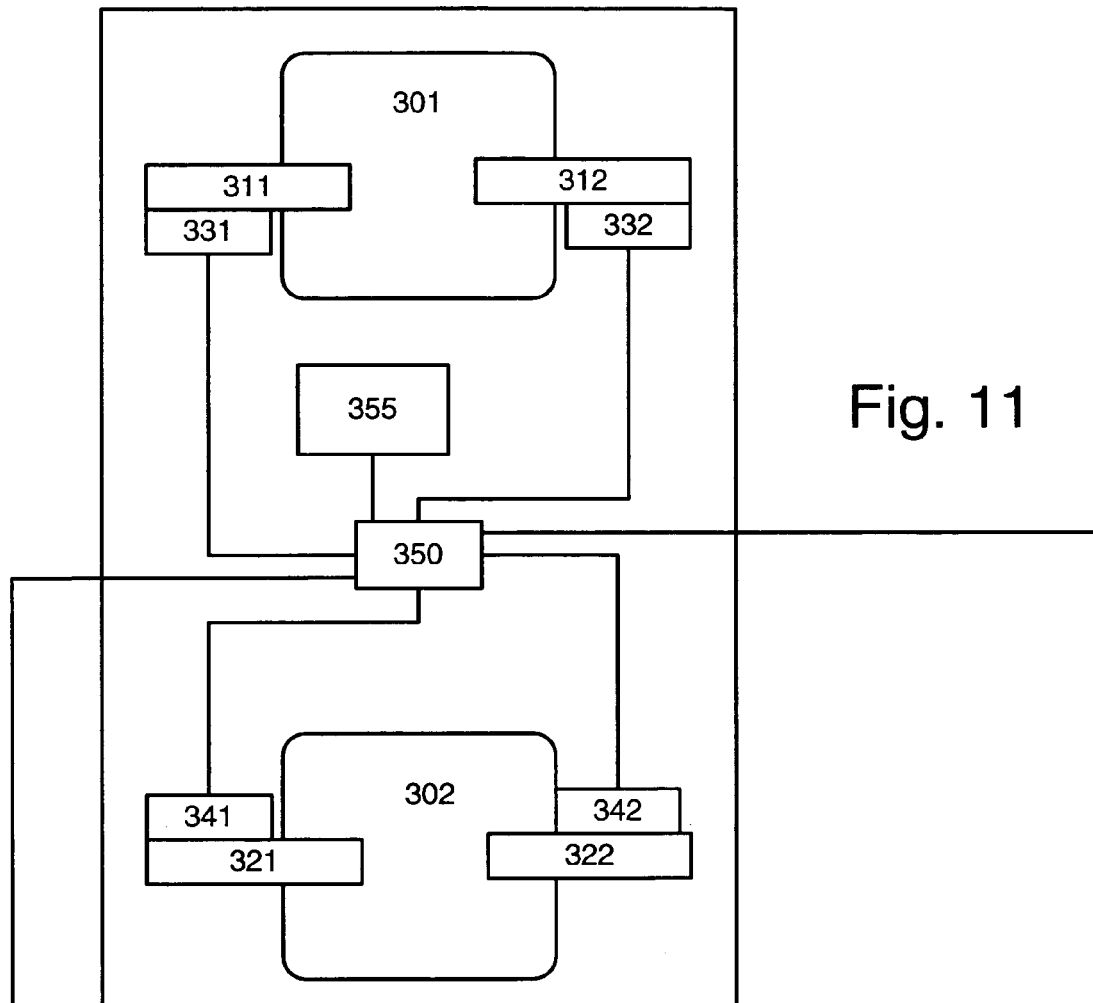
Fig. 11
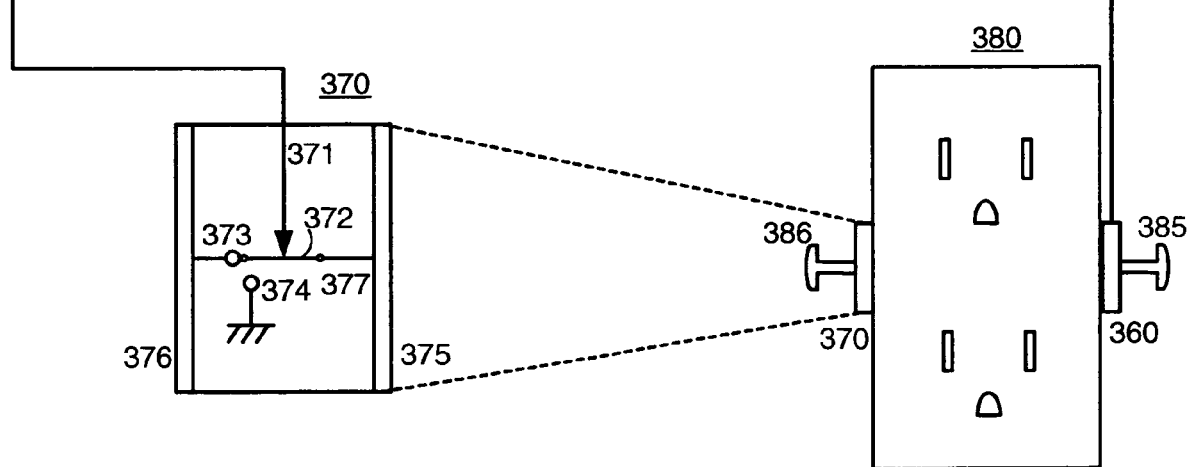

ELECTRICAL MONITORING AND CONTROL SYSTEM

This application claims priority from U.S. provisional patent application Ser. No. 61/067,693, filed Feb. 29, 2008, having common inventors herewith.

BACKGROUND OF THE INVENTION

The present invention relates to building electrical system monitoring and control.

U.S. Patent Application Publication US 2007/0155349 (Nelson et al.) discloses a system for selectively controlling electrical outlets using power profiling. An electrical outlet includes a socket for receiving a plug, an outlet identification and a signal detector for detecting a signal from the plug, for sending the signal and outlet identification to a controller, and for receiving a command from the controller, such as to reduce or cut power to the device plugged into the outlet when the device's operation deviates from an operational profile for the device. The system may be used with motion sensors and other environmental components.

Blemel and Furse, "Applications of Microsystems and Signal Processing for Wiring Integrity Monitoring", 2001 *IEEE Aerospace Symposium,* 12 pages, the disclosure of which is hereby incorporated by reference, discuss detection and prevention of wiring related problems in aerospace vehicles. Blemel presents a system in which sensors in an aircraft interface with processors; the processors are networked together on an aircraft and are able to communicate with a central web server. The processors implement algorithms for fault detection, identification, location, prediction and messaging.

U.S. Pat. No. 5,991,327 (Kojori) discloses a controller that receives a plurality of sensor readings, including some extra readings for diagnostic protection, and processes the readings to predict and control voltages and currents in an electric arc furnace.

An arc fault circuit interrupter (AFCI) is a circuit breaker designed to prevent fires by detecting non-working electrical arcs and disconnect power before the arc starts a fire. Arc faults in a home are one of the leading causes for household fires. AFCIs resemble a GFCI/RCD (Ground-Fault Circuit Interrupt/Residual-Current Device) in that they both have a test button. GFCIs are designed to protect against electrical shock, while AFCIs are primarily designed to protect against fire.

Starting with the 1999 version of the National Electrical Code (NEC, also called NFPA 70) in the United States, AFCIs are required in all circuits that feed receptacles in bedrooms of dwelling units. This requirement is typically accomplished by using a kind of circuit-breaker (defined by UL 1699) in the breaker panel that provides combined arc-fault and overcurrent protection. Not all U.S.A. jurisdictions have adopted the AFCI requirements of the NEC as written. An AFCI detects sudden bursts of electrical current in milliseconds, long before a standard circuit breaker or fuse would trip.

In 2002, the NEC removed the word "receptacle" leaving "outlets", in effect adding lights within dwelling bedrooms to the requirement. The 2005 code made it more clear that all outlets must be protected. "Outlets" is defined in "Article 100 Definitions" of the NEC as "A point on the wiring system where current is taken to supply utilization equipment" and this includes receptacles, light fixtures, and smoke alarms, among other things.

Beginning January 2008, only "combination type" AFCIs will meet the NEC requirement. The 2008 NEC requires installation of combination-type AFCIs in all 15 and 20 amp residential circuits with the exception of laundries, kitchens, bathrooms, and garage, and unfinished basements.

Zigbee is a wireless technology that does not have the speed or bandwidth of Wi-Fi or Bluetooth, but is designed for wireless building controls. ZigBee is based on IEEE Standard 802.15.4 and creates a self-organizing wireless network where any ZigBee-compliant device introduced into the environment is automatically incorporated into the network as a node. A number of manufacturers are currently developing devices that incorporate this technology, including switches, thermostats and other common monitoring and control devices. ZigBee devices are battery powered, which means that they do not need any interconnecting wiring. These devices remain dormant until they are activated by an incoming signal, so their batteries can last for months or even years without replacement.

ZigBee devices have the ability to form a mesh network between nodes. Meshing is a type of daisy chaining from one device to another. This technique allows the short range of an individual node to be expanded and multiplied, covering a much larger area. One ZigBee network can contain more than 65,000 nodes (active devices). The network they form in cooperation with each other may take the shape of a star, a branching tree or a net (mesh). There are three categories of ZigBee devices: ZigBee Network Coordinator. Smart node that automatically initiates the formation of the network. ZigBee Router. Another smart node that links groups together and provides multi-hopping for messages. It associates with other routers and end-devices. ZigBee End Devices. Sensors, actuators, monitors, switches, dimmers and other controllers.

Z-Wave is an interoperable standard for residential and light commercial devices, providing reliable, confirmable, low bandwidth, half duplex two way control communications via wireless mesh neworking. The Z-Wave development platform is described at www.zen-sys.com. The Z-Wave Protocol is for communicating short control messages from a control unit to one or more slave units. Slave units can forward commands to other slave units. The ZM3102N Z-Wave Module contains the ZW0301 Z-Wave Single Chip, system crystal and RF front-end circuitry. The ZW0301 Single Chip includes an RF transceiver, 8051 MCU core, SRAM, Flash Memory for Z-Wave Protocol and OEM Application storage software, Triac Controller, and various hardware interfaces.

Motorola sells Home Monitoring and Control System Wireless Temperature Sensors, namely model HMTS1050 and model HMSM4150, that are intended to be placed in a room, and programmed with an upper and/or lower limit. When the limit is exceeded, the system sends a text alert to a cell phone or e-mail.

While there is concern about the electrical infrastructure of buildings, including residential and commercial, there is still room for improvement.

SUMMARY OF THE INVENTION

In accordance with an aspect of this invention, there is provided a system for monitoring and controlling the electrical infrastructure of a building.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 2 is a chart showing instantaneous arcing;

FIG. 3 is a chart showing how a digital optical sensor reacts to the signal of FIG. 2;

FIG. 4 is a chart showing continuous arcing;

FIG. 11 is a block diagram showing a faceplate for sensing operation of a device plugged into an outlet, and for terminating power when an exception condition occurs;

DETAILED DESCRIPTION

Figure 1:
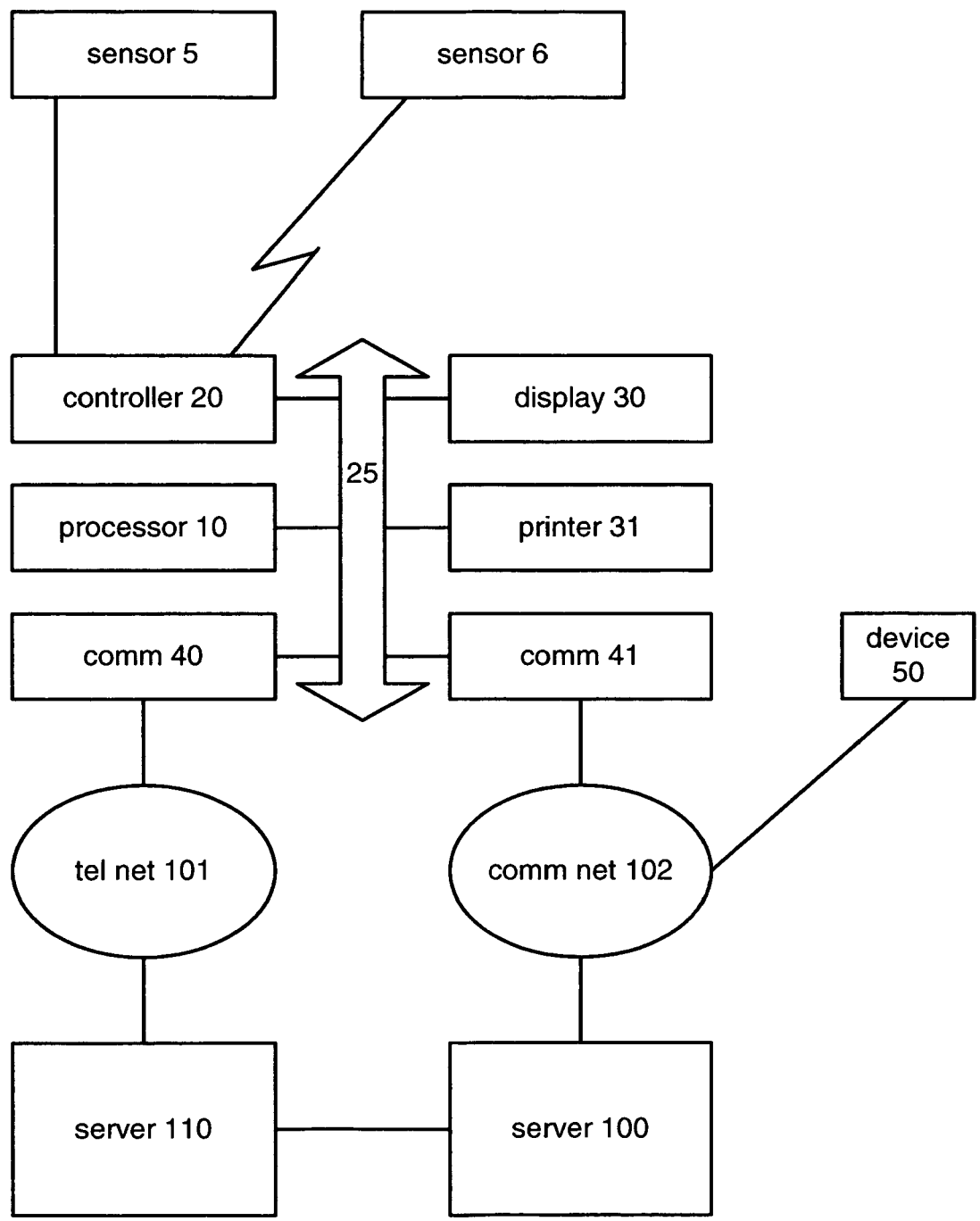
FIG. 1 is a block diagram showing the elements of the present system.

FIG. 1 shows sensors 5, 6 coupled to controller 20. Sensor 5 uses a wireline connection, while sensor 6 uses a wireless connection. Local communication network 25 couples processor 10, controller 20, display 30, printer 31, and communication interfaces 40, 41. Each of processor 10, controller 20 and communication interfaces 40, 41 may be one or more general purpose computers programmed according to the present invention.

Communications interface 40 is coupled via suitable means, such as a wireline or wireless connection, to public switched telephone network 101, which in turn is coupled to third party server 110. The third party may be, e.g., a police station, firehouse, or other service.

Communications interface 41 is coupled via suitable means, such as a wireline or wireless connection, to communications network 102, such as the Internet, which is also coupled to server 100 and device 50. Server 110 is coupled to server 100, such as directly or via communication network 102.

Sensor 5 senses the operating condition of one or more components, such as a wall receptacle, a plug-in group of receptacles (also referred to as a current tap or power strip), a wall on/off switch, a wall dimmer, a fusebox, power-carrying wires, communications wires and so on. The operating condition includes environmental conditions such as temperature, humidity and so on. The sensing occurs in a manner suitable for the device, and may include temperature readings, voltage readings, power readings, image readings, acoustic readings and so on. In the case of communication lines, sensing may include the name and identity of a device, such as its Internet Protocol (IP) address, and other network monitoring functions. The sensing may occur in a passive or an active mode. Sensor 6 is generally similar to sensor 5, but senses other devices, demonstrating that there are plural sensors in the present configuration.

For a new installation, sensors 5, 6 may be built-in, and their location optimized according to a procedure. For an existing installation, sensors 5, 6 can be retrofit via plug-in or stick-on modules designed to minimize installation difficulty.

Sensor 5 may be similar to Tmote Invent, a fully packaged wireless sensing unit built on Moteiv's Tmote Sky wireless module, the follow-on to Moteiv's Telos sensor. Moteiv was purchased by Sentilla, and the Tmote Invent is no longer offered. Tmote Invent, designed for industrial applications including building monitoring and security control, included integrated sensors for light, temperature, vibration (2-axis accelerometer) and sound (microphone). Tmote Invent included a speaker for auditory feedback, headphone jack for discrete applications, and LEDs for visual feedback. Included with each Tmote Invent Application Kit was Moteiv's robust distribution of the TinyOS open-source operating system. Designed for low-power, long-lived mesh networking, the distribution allows application developers to tune and configure the system through highly flexible interfaces. The result was a customizable yet robust low-power sensing system. Features included: Low power wireless mesh technology, Programming and data collection via USB, Light, Temperature, Acceleration, and Sound sensors, Speaker, LEDs, and User input buttons, rechargeable battery that charges through any standard USB port, 250 kbps 2.4 GHz IEEE 802.15.4 Chipcon Wireless Transceiver, Interoperability with other IEEE 802.15.4 devices, 8 MHz Texas Instruments MSP430 microcontroller (10 k RAM, 48 k Flash), Integrated antenna with 50 m range indoors/125 m range outdoors, Ultra low power consumption.

Sensor 5 is associated with one of a variety of devices (not shown), such as an electrical receptacle, a faceplate, a circuit breaker, an air-conditioning unit, a refrigerator, and so on. Sensor 5 may have local data analysis capability.

Multiple characteristics of the same device or line may be sensed, to provide a variety of readings, possibly redundant, discussed below.

Controller 20 receives the sensor readings and stores them in a storage device (not shown). In cooperation with processor 10, controller 20 processes the sensor readings.

For example, controller 20 may determine if a sensor reading is outside of a range, and then alert processor 10 that emergency processing is needed. If the sensor reading is within the range, then controller 20 simply stores the reading so that processor 10 will process it in due course.

Processor 10 processes sensor readings to predict faults and to detect faults. Processor 10 reports status of the devices and wires being monitored to display 30, printer 31, and possibly other notification devices such as an audible alarm. In some cases, processor 10 takes control action on its own, such as isolating failed devices by eliminating power. In other cases, processor 10 responds to instructions entered locally by an input device (not shown), or received from a remote controlling unit, such as server 100 or 110.

Processor 10 may also communicate with conventional monitoring systems, such as home security systems via an interface (not shown).

Processor 10 also reports status to server 100 and server 110.

Server 100 and server 110 can query processor 10 for status. For example, if sensor 5 is a camera, then server 100 can command processor 10 to obtain an image from sensor 5.

Server 100 functions in similar manner as processor 10, except server 100 can run more sophisticated software, and can combine readings from a wider variety of sensors and systems. For example, server 100 may run image processing software that is beyond the processing capability of processor 10.

Server 100 can poll processor 10 for its status, and receive messages from processor 10, either periodically or in response to events. Server 100 can download updates to processor 10.

Since server 100 communicates with many systems, it serves as a one-stop point of contact for a user, such as a homeowner away from home. The user can communicate with server 100 via device 50, which may be a personal computer, cellphone with Internet browsing capability, vehicle telephone, or other suitable device. Server 100 may communicate alerts or other status information to device 50.

For example, a third party server (not shown) may be a child location tracking service, and the user can readily determine, via device 50, whether the child is near a failed receptacle.

Energy conservation procedures are implemented when the sensed information is used to control the devices being sensed.

In a fault detection and diagnosis (FDD) process, sensor readings are obtained and analyzed to detect and/or predict faults. A "fault" refers to any operation outside a "normal" operating range, that is, cessation of operations is not necessarily needed to be in a fault condition. For example, an electrical outlet with serial arcing is likely to exhibit fault characteristics. As another example, excessive energy use by a device may be considered a fault, and the device can be automatically controlled to reduce its energy usage.

Sampling sensors at a low rate may miss events such as transients occurring between sampling points. However, generally, it is not practical to continuously sample many sensors at a high sampling rate, because (i) a large amount of data will need to be transmitted, (ii) when comparing data from different sensors, synchronization becomes difficult with huge volumes of data, and (iii) storage limitations make it costly to save huge amounts of data; typically only a predefined amount of data is saved which limits historical analysis to only the timeframe of predetermined amount of data.

An event-triggered sampling rate is determined as follows. A first sensor is sampled at a higher data rate than other sensors. The sensor readings from all sensors are analyzed, and when first event conditions are met, the sampling rate of other sensors is adjusted, the adjustment occurring during a predetermined time interval or until second event conditions are met.

Event-triggered sampling relies on bi-directional communication. Generally, sensor readings are sent from sensor 5 to controller 20, and control information is sent from controller 20 to sensor 5.

Sensors can include current sensors (for example, Hall-effect sensors), temperature sensors such as a thermocouple, humidity sensors, optical sensors, spatial thermal imaging sensors (infrared cameras), other regional sensors, and so on. Sensors can be analog or digital.

In one embodiment, the first and second event conditions are predefined, such as by a person. Predefined event conditions exhibiting a certain pattern over an approximate time interval are sometimes referred to as a fingerprint or profile. Analysis is typically called fingerprint analysis with pattern recognition.

For example, when a device is plugged into a receptacle, there may be an immediate burst of current activity, possibly corresponding to sparks on the blades of the plug; this corresponds to a first fingerprint. As another example, a device that is plugged into a receptacle and changed from an "off" to an "on" condition exhibits a particular pattern of current activity, corresponding to a second fingerprint.

The analysis software determines whether a normal event is occurring by comparing the duration of activity with the duration of the known fingerprints; if the duration is outside the fingerprint time bounds, then an abnormal event is occurring and a fault is likely.

The analysis software is further able to determine whether a normal event is occurring in a normal manner by comparing the pattern of actual activity with the patterns of the known fingerprints, and determining abnormal operation exists when the actual pattern is outside the threshold of the fingerprints, and so a fault is likely.

The system has the capability to learn from new information or patterns not previously defined, and can conduct signal-based FDD, and can incorporate such new patterns with a learning tool, such as an expert system, that expands the knowledge database for FDD.

In another embodiment, event conditions are learned by the analysis system.

For example, initially "normal" is defined as a particular value, and "within normal range" is defined as a predetermined difference from the particular value. When the system detects operation outside of normal range, it produces an alarm; if a human then accepts the operation regularly, such as three times, the system adjusts the predetermined difference to a new amount, thereby learning the acceptable behavior of the system.

Use cases will now be discussed with respect to arcing.

Arcing refers to an electrical current in which electrons jump across a gap. Unwanted arcs in electrical circuits can cause fires.

The duration of a single arcing event is generally instantaneous, such as less than one microsecond. The amplitude of the instantaneous spike in an arcing event is characterized by an initial decrease in current followed by an increase in current, as shown in FIG. 2. It is helpful to distinguish between the spikes in a series of single arcing events, rather than treat a series of spikes as one signal. FIG. 2 shows an instance of a single arcing event.

FIG. 3 shows how an optical sensor detects the arcing event of FIG. 2. Generally, the optical sensor's digital output corresponds to the spark that a human observes.

Continuous arcing signals represent continuous arcing due to, e.g., intermittent contact or an aging connection, and display a fingerprint detectable using FDD and pattern recognition. Continuous arcing signals are normally below the regular signal amplitude because of the increase in contact resistance, and normally display repeatable patterns useful for diagnosis. FIG. 4 shows a typical continuous arcing signal pattern. The current initially is at a steady-state level. When continuous arcing occurs, the current displays a quick drop in values and jumps up and down with a zigzag pattern. The time duration is about 0.01-2 seconds.

Use Case 1: FDD Based on Fingerprint

Figure 5:
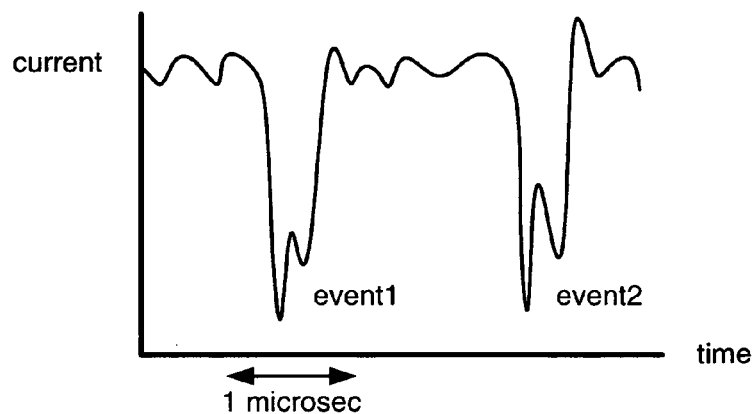
FIG. 5 is a chart showing two instances of single arcing.

FIG. 5 is a chart showing two instances of single arcing, labeled "event1" and "event2". The abscissa (x-axis) shows time while the ordinate (y-axis) shows current. In this example, sensor 5 is an analog current sensor, whose output, shown in FIG. 5, is provided to processor 10, which detects when the signal amplitude has exceeded five times the normal signal amplitude for less than one microsecond, and determines that this is an arcing event because such behavior fits the characteristics of the arcing fingerprint.

After determining that an arcing event exists, in this example, processor 10 continues to monitor the signal. One single arcing event per 5 minutes is defined as acceptable.

Two or more single arcing events per 5 minutes is defined as a possible fault, and processor 10 reports this condition to server 100. Four or more single arcing events per 5 minutes is defined as a threat, and processor 10 sends a signal to a circuit breaker (not shown) to shut off the current supplied to sensor 5, and of course, any device that is drawing such current, and processor 10 also reports its automatic shut off to server 100.

Use Case 2: FDD with Redundancy

Figure 6:
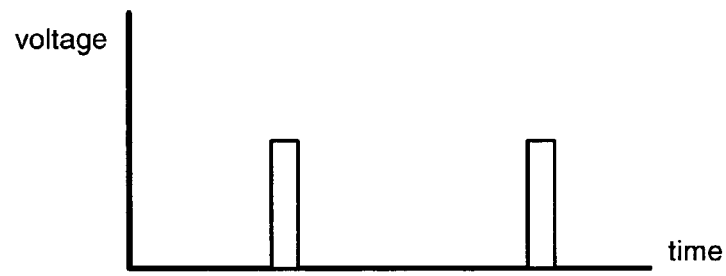
FIG. 6 is a chart showing how a digital optical sensor reacts to the signal of FIG. 5.

FIG. 6 is a chart showing how a digital optical sensor reacts to the signal of FIG. 5, and generally corresponds to the sparks that humans identify as arcing.

In this example, processor 10 receives the output of an analog current sensor and a digital optical sensor. When the current sensor senses an amplitude of at least five times normal and the optical sensor turns on, then processor 10 concludes that an arcing event has occurred, without concern for the duration of time that the analog signal amplitude exceeds five times the normal. Subsequent processing of processor 10 may be as in use case 1.

Use Case 3: FDD with Change in Sampling Rate

Figure 7:
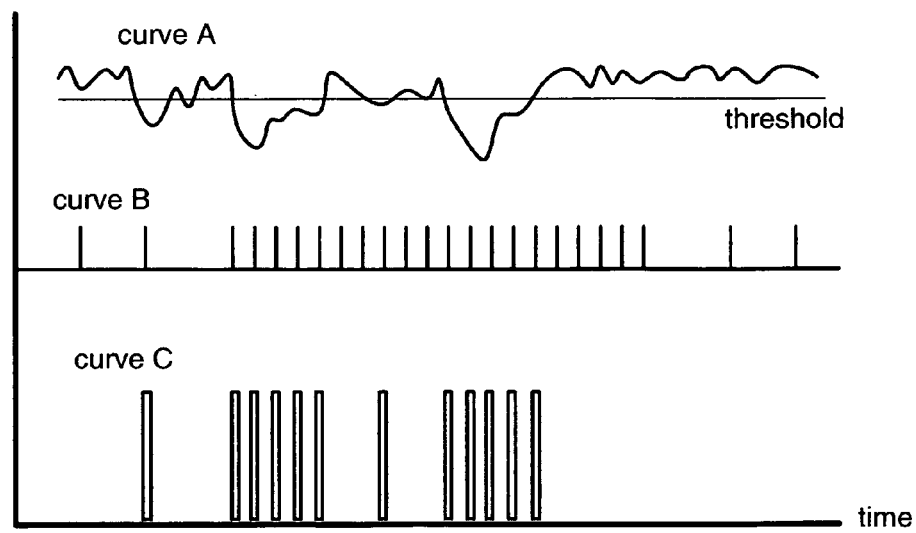
FIG. 7 is a chart showing, as "curveA", the current versus time for an intermittent contact; as "curveB", a sampling rate that is dynamically changed; and as "curveC", the output of a sensor whose sampling rate is dynamically changed.

FIG. 7 is a chart showing, as "curveA", the current versus time for an intermittent contact; as "curveB", a sampling rate that is dynamically changed; and as "curveC", the output of a sensor whose sampling rate is dynamically changed.

Let it be assumed that curveA represents an analog signal for a connection that is not secure, i.e., a connection that exhibits an intermittent contact situation. Assume the sampling rate is as shown in curveB, and that curveC represents what is sampled, such as a sensor that turns on when the current is below a threshold value, shown as "threshold" relative to curveA.

Beginning at the left side of curveC, no signal is produced, so the sampling rate stays at a first lower rate. Then, when a signal is produced, the sampling rate is shifted to a second higher rate creating a smaller sampling interval that improves the likelihood of capturing critical information. The sampling rate remains at the higher rate until no signal is produced in five successive sampling intervals, at which time the sampling rate is shifted back to the first lower rate. Five intervals is chosen for ease of illustration; in actuality, the number of intervals is about 50-500 intervals, or an interval amount determined by a FDD algorithm.

Use of a dynamic sampling rate increases the chance that events of interest will be captured, while reducing the data rate during "normal" operation, when no events of interest are occurring, from a fault detection perspective.

A vectorized map for intelligent fault detection and diagnosis (iFDD) and redundancy will now be discussed.

Figure 8:
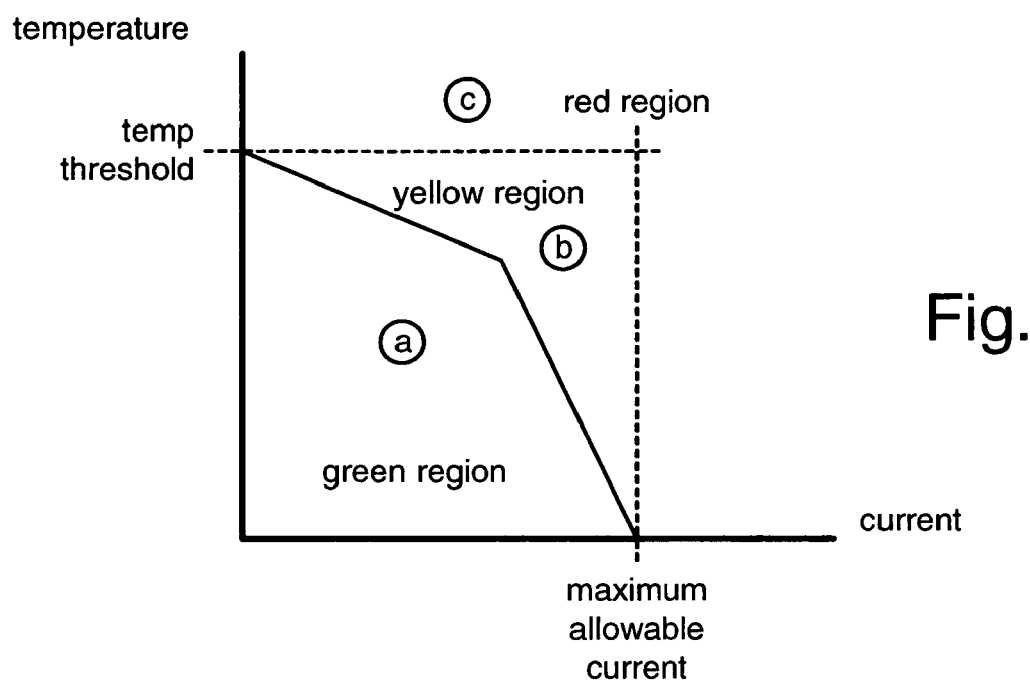
FIG. 8 shows a vectorized map.

A vectorized map is akin to the Cartesian coordinates with XY axes. Every two sets of data from two sensors can be used to construct a vectorized map to represent the characteristics of faults of a system, in a way similar to that of XY Cartesian coordinates with points on the XY space represented by the coordinates (x, y). This type of vectorized map, after calibration, can provide very useful information for diagnosis. FIG. 8 provides an illustration of how this type of vectorized map can be used.

In FIG. 8, the current is in the horizontal axis, and the temperature measured at a prescribed location is in the vertical axis. Each measurement has its own threshold value above which a fault can be triggered, as shown in the "red region" area with the arrows indicating the "max. allowable current" and the "temperature threshold". For example, an operating situation illustrated by the point "c" indicates such situation that requires immediate attention due to the presence of fault. When such two signals are plotted on the vectorized map, an intermediate region indicated by the "yellow region" does not, by definition, exceed the threshold of safety; however, the combination of marginally safe operation based on the two sensors can present a safety concern if the operating parameters are maintained at this level for extended period of time. The point "b" illustrates such a condition in this region, which may cause a fault in due time. The "green region" is the region of safe operation, illustrated with a point "a."

Such vectorized map of a pair of sensory data can be applied to include more pairs of data. If there are n such pairs, we effectively will have n ways of looking at the fault under consideration. The information rendered by these n different sources can complement one another and corroborate to render a more reliable diagnosis because of the redundant information.

An iFDD system is adopted, which is capable of exploiting both time-domain and frequency-domain analysis to complement each other. Such system provides redundancy in data analysis and can deliver more precise diagnosis because information on both domains are utilized and corroborated. Such kind of domain redundancy in analysis can be achieved by signal processing algorithms such as wavelet analysis.

Using multiple sensors: redundancy can also be established by using multiple pairs of sensory information. For example, the "Vectorized Map for iFDD" discussed above uses a pair of sensory information. When a different pair of data is employed for FDD, the results can provide "redundancy" to the first diagnosis. The additional diagnosis can confirm the results of the first diagnosis, or to provide additional insights to the first diagnosis. In either case, the two complements each other and can enhance the accuracy of the diagnosis. As a result, the confidence level of FDD is increased.

The "redundancy" referred to above is a result of having more sensors than the minimum set (in this case, one set of data pair) needed for FDD. Such redundancy provides additional benefits in the process of FDD.

Learning will now be discussed.

Figures 9A, 9B:
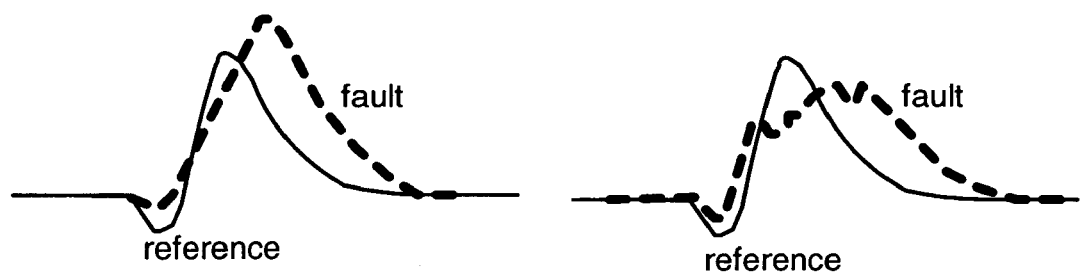
FIGS. 9A and 9B are curves referenced in explaining iFDD.

Event-triggered iFDD depends on the detection of events. A system that is capable of learning and modifying the recognition of events is desirable to intelligently adapt to different operating conditions. This can be done as follows:

Recognize fingerprint: for example, refrigerator—turning off and on of the compressor. The transition will emit a signal which has its own fingerprint. As an example, when the fingerprint changes suddenly, a fault is likely to be developed in the system. The recognition of such fingerprint and its changes is a reliable way of implementing iFDD. As another example, shown in FIGS. 9A and 9B, the reference fingerprint is shown in solid line from the operation without fault. When a fault is developed (in this a leakage in the system), the fingerprint of the signal for the same operation changes and can be used for iFDD. The fingerprint (in solid lines) of reference is the same, but the response from different sources of fault can be different. This can also be utilized as information for FDD. The data shown are from wavelet analysis (for example, cD3 wavelet data).

Learning of behavior: This is best understood by an example. Let's take the air-conditioner as an example, with a compressor for the heat exchange cycle. When the compressor has been operating normally for a while, a certain reference operating performance is established. At some point, a window in the room was left open which causes the unit to operate harder and turn on for longer period of time, deviating from the nominal operating behavior. If this persists, a warning can be issued to the use to check the surrounding and check if windows/ doors are to be closed to bring the air-conditioner back to normal operations. This learning behavior can save energy by using the aforementioned iFDD algorithm.

A faceplate for an electrical receptacle will now be discussed. The faceplate has a sensor for sensing operation of the device plugged into the electrical receptacle.

Figure 10:
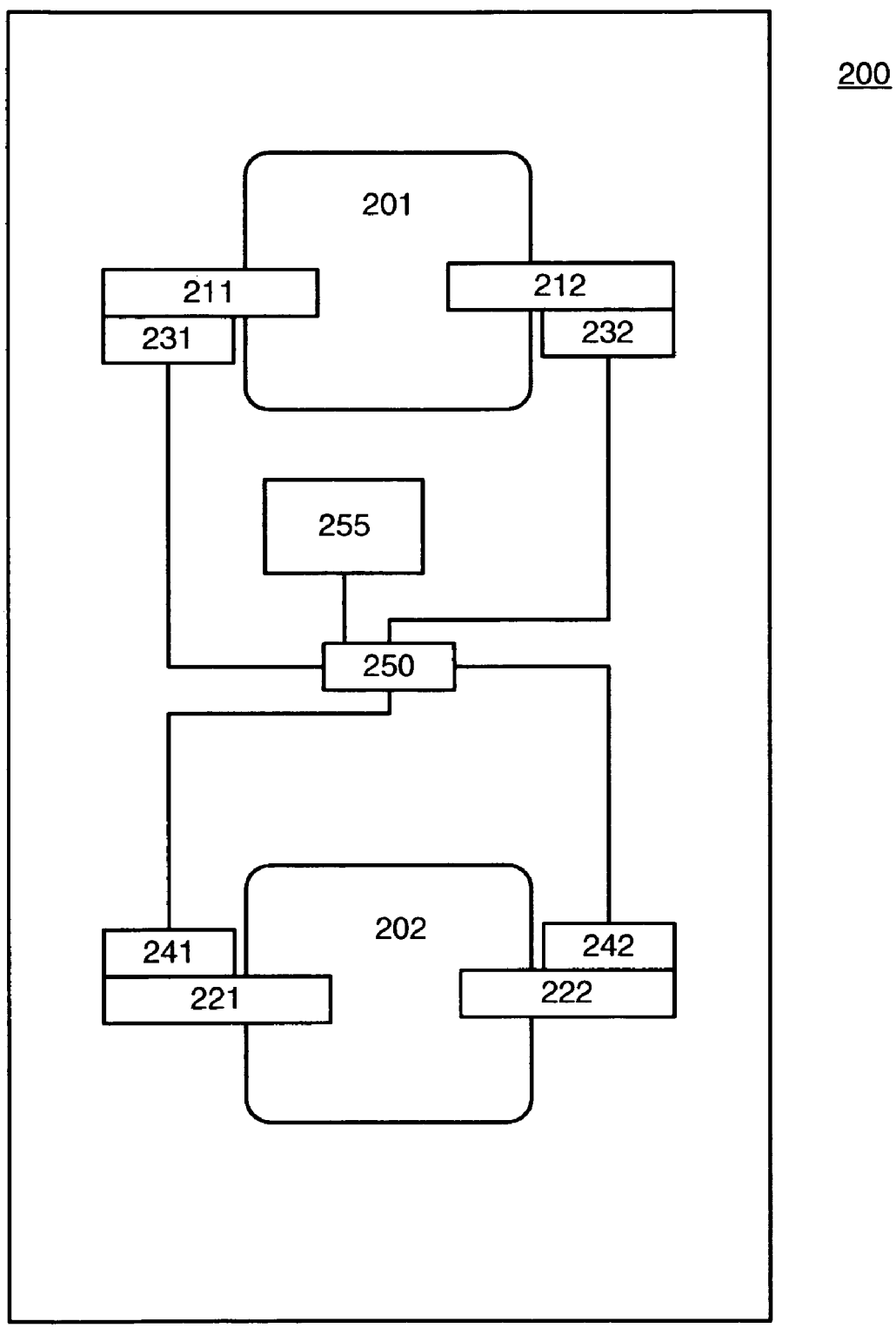
FIG. 10 is a block diagram showing a faceplate for sensing operation of a device plugged into an outlet.

FIG. 10 shows an embodiment where the sensor is on the backside of the faceplate. An embodiment where the sensor is on the front side of the faceplate is contemplated, but not shown. As used herein, front side is the side that is visible when the faceplate is installed over an electrical receptacle.

FIG. 10 shows faceplate 200 having apertures 201, 202. In a standard receptacle, there are two receptacles, a top receptacle and a bottom receptacle. Aperture 201 surrounds the top receptacle, while aperture 202 surrounds the bottom receptacle. Faceplate 200 also has sensor strips 211, 212, 221, 222, each of which is formed of a heat conducting material, such as used to dissipate heat from computer chips, described for example in European Patent EP0696630, "Heat conductive material and method for producing same", Feb. 14, 1996, the disclosure of which is hereby incorporated by reference. The width of each sensor strip is such that its inward edge, relative to the aperture is determined so that the inward edge contact a blade of a plug that is plugged into the receptacle.

Sensor strips 211, 212, 221, 222 are constructed similarly. For brevity, only sensor strip 211 is discussed.

Sensor strip 211 is coupled to element 231 that converts its temperature to an electrical signal. Coupling occurs, for example, by connecting element 231 to sensor strip 211 via epoxy. Suitable temperature sensors for element 231 include:

Analog Devices AD590 2-Terminal IC Temperature Transducer—an integrated circuit that produces an output current proportional to absolute temperature, at temperatures up to 150° C. (316° F.). See www.analog.com.

Omega.com 44000 Series Thermistor—A thermally sensitive resistor available in two types: negative temperature coefficient (NTC), or positive temperature coefficient (PTC). NTC thermistors have a highly non-linear change in resistance and reduce their resistance with increases in temperature. Epoxy coatings are used for temperatures from −50 to 150° C. (−58 to 316° F.). See www.omega.com.

Betatherm BetaLinear 36K53A1 thermistor, providing up to 400 times the output of a thermocouple with no need for junction temperature or lead wire compensation, operating at 0 to 100° C.

The output of the temperature sensor element 231 is transmitted, at predetermined intervals, to a controller, such as processor 10. Specifically, the output of the temperature sensor element is provided to transmitter element 250, such as the ZM3102N Z-Wave Module, described in the background section of this application. Transmitter 250 obtains power from battery 255.

Although faceplate 200 has been described in an embodiment wherein the temperature is sensed, other embodiments are contemplated, such as where current or other characteristic is sensed.

FIG. 11 shows a faceplate that senses an operating condition and, upon detection of an exception condition, cuts off power to the electrical receptacle and notifies an external processor. FIG. 11 is similar to FIG. 10, and only the differences are discussed for brevity.

FIG. 11 shows faceplate 300 that fits over receptacle 380. Transmitter element 350 also is connected to switch elements 360, 370, which are similar to each other; only switch element 370 is discussed in detail. Switch elements 360, 370 are torus (doughnut) shaped.

Generally, wires can be coupled to receptacles via the side-wire method, in which wire is wrapped under a screwhead, the back-wire method, in which wire is inserted from behind through a hole or slot and clamped under a clamping plate as the screw is tightened, or the push-wire method, in which a wire is simply pushed into a terminal and clamped by a spring-loaded brass member inside the terminal. The push-wire method causes many loose connections, and is not favored for this reason. FIG. 11 shows receptacle 380 adapted for side-wire connection. Screws 385, 386 are non-conductive screws, such as plastic, rather than the typical metallic screws.

Switch elements 360, 370 are placed between the contacts on the side of receptacle 380 and the household wiring (not shown), the household wiring being held in place by tightening screws 385, 386. Screws 385, 386 respectively insert through the toroidal centers of switch elements 360, 370.

Switch element 370 is has conductive plates 375, 376, such as brass or copper alloys, on either side, to ensure conduction between the household wiring and the side of receptacle 380, respectively. Plates 375, 376 are connected to wires 377, 373. Movable wire 372 is controlled by control wire 371 to connect between wire 377 and either wire 373 or ground 374.

During normal operation, movable wire 372 is connected between wire 377 and wire 373, so that power flows through receptacle 380. When transmitter element 350 detects that the sensed temperature exceeds a predetermined temperature, transmitter element 250 sends a signal along control wire 371 to switch movable wire 372 to ground 374, thus cutting off power to receptacle 380. In other embodiments, controller 10 commands transmitter element 350 to control switching elements 360, 370 to cut off power to receptacle 380.

Figure 12A:
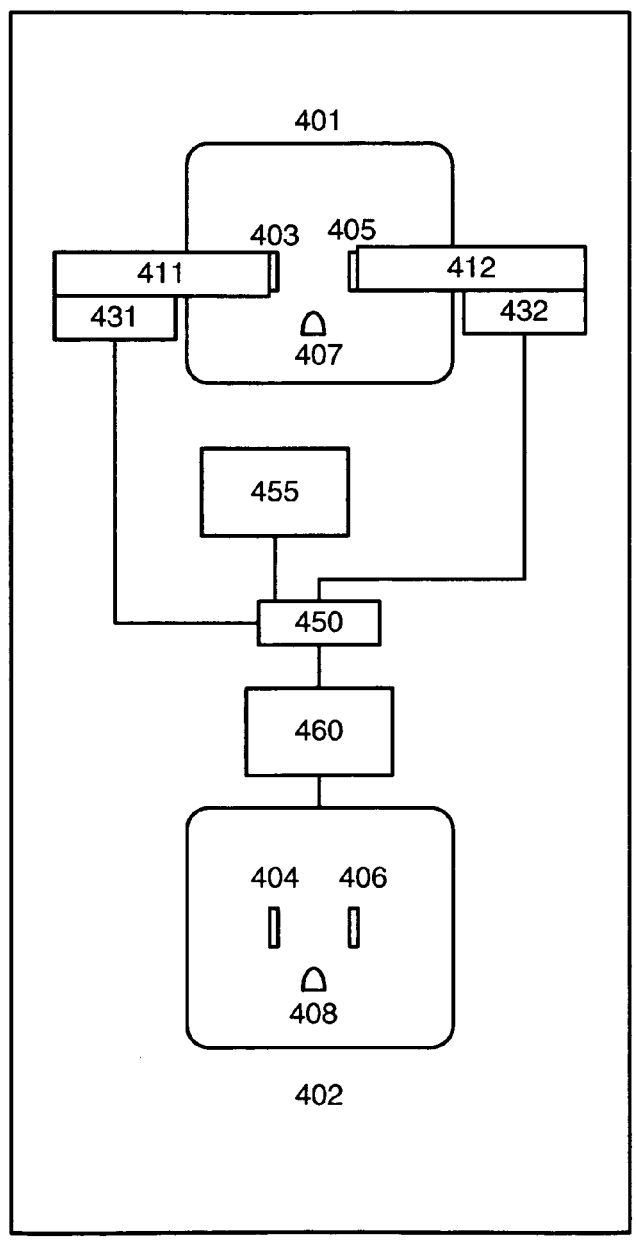
FIGS. 12A and 12B are block diagrams showing a back view and a side view of a current tap for sensing operation of device plugged into it.
Figure 12B:
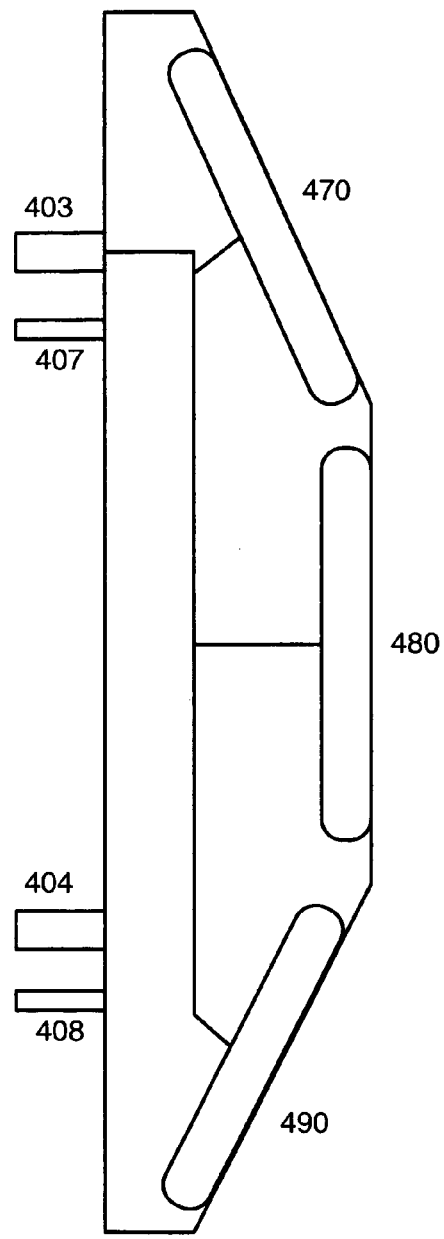

FIG. 12A shows a back view current tap 400. FIG. 12B shows a side view of current tap 400. Generally, current tap 400 has a top pair of prongs 403, 405, top ground prong 407, a bottom pair of prongs 404, 406, and bottom ground prong 408, for respectively plugging into a household outlet. Current tap 400 also provides receptacles 470, 480, 490, each having two slots for the prongs of a device plug, and also each having an opening for a ground prong of a device plug.

Top prongs 403, 405 provide power to receptacles 470, 480, 490. Prongs 403, 405 are in conductive contact with elements 411, 412, that function similarly to elements 211, 212 discussed above with regard to faceplate 200.

Bottom prongs 404, 406 provide power to transformer 460.

During normal operation, transmitter element 450 derives power through bottom prongs 404, 406. However, when an exception condition occurs, or when commanded by processor 10, transmitter element 450 switches to battery 450 for its power.

In other embodiments, sensors are provided for each of receptacles 470, 480, 490.

Figure 13:
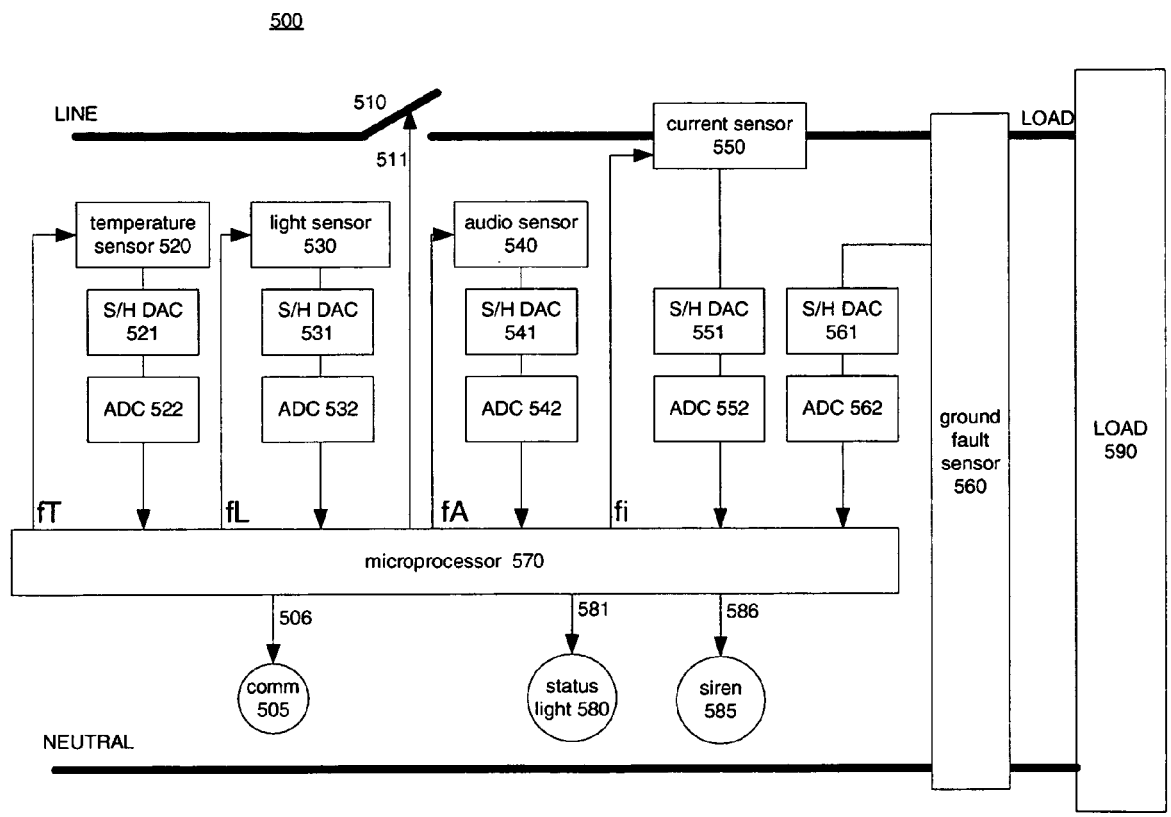
FIG. 13 is a schematic of a circuit according to the present invention.

FIG. 13 is a schematic of circuit 500 according to the present invention, shown as a receptacle. In another embodiment, the circuit is a plug-in device, for retrofitting an existing outlet, lacking sensors 550, 560.

Line current is supplied to load 590 via switch 510 controlled by controller 511.

Temperature sensor 520, such as a thermocouple (e.g., Omega part 5TC-TT-K-36-36) or thermistor (e.g., General Electric part RL503-27.53K-120-MS), is located next to the screw (not shown) or other fastener for the line wire, as this location tends to become hot in a receptacle. Another hot spot is the blades of a plug. In a plug-in retrofit device, sensor 520 is located near the blade that is plugged into the plug-in retrofit device. Sensor 520 produces a sensed temperature signal, and supplies the sensed temperature signal to sample and hold data acquisition (SHDAC) element 521 (e.g., National Semiconductor part ADC1615626) that serves to latch (preserve in time) the sensed temperature signal, so that its time reference can be synchronized with other sensed signals. SHDAC element 521 supplies the latched sensed temperature signal to analog-to-digital converter (ADC) 522 that operates to convert the analog sensed temperature signal to digital data, and supplies the digital sensed temperature signal to microprocessor 570.

Light sensor 530, such as a photodiode (e.g., Advanced Photonix Inc. part PDB-C158F) or infrared camera, is located near the screw (not shown) or other fastener for the line wire. Sensor 530 produces a sensed light signal, and supplies the sensed light signal to SHDAC 531 that operates in similar manner as SHDAC 521. ADC 532 operates in similar manner as ADC 522 to supply a digitized sensed light signal to microprocessor 570.

Audio sensor 540, such as a microphone (e.g., Knowles Acoustics part MD9745APA-1), is located at a convenient place in or on the receptacle. Sensor 540 produces a sensed audio signal, and supplies the sensed audio signal to SHDAC 541 that operates in similar manner as SHDAC 521. ADC 542 operates in similar manner as ADC 522 to supply a digitized sensed audio signal to microprocessor 570.

Current sensor 550 is a Hall-effect current sensor (e.g., Functional Devices Inc. part RIBX420 or Eaton Cutler-Hammer part EAC1420SP) and senses the line current supplied to load 590. Sensor 550 produces a sensed current signal, and supplies the sensed current signal to SHDAC 551 that operates in similar manner as SHDAC 521. ADC 552 operates in similar manner as ADC 522 to supply a digitized sensed current signal to microprocessor 570.

Optional ground fault sensor 560 produces a ground fault trip signal, and supplies the ground fault trip signal to SHDAC 561 that operates in similar manner as SHDAC 521. ADC 562 operates in similar manner as ADC 522 to supply a digitized ground fault trip signal value to microprocessor 570.

Microprocessor 570 is a general purpose microprocessor programmed according to the present invention, and includes suitable memory (not shown). Microprocessor 570 receives the digitized values from ADCs 522, 532, 542, 552, 562, and generates a control signal for controller 511 to interrupt the line current, generates control signal 581 for status light(s) 580, which may be one or more light emitting diodes (LEDs) or other suitable device, generates control signal 586 for siren 585, which may be a speaker or other device emitting an audible signal, and generates a communication signal for wireless communication interface 505 that communicates with controller 20 of FIG. 1. Microprocessor 570 also receives communication signals via communication interface 505 from controller 20. Microprocessor 570 also generates sampling frequency control signals fT, fL, fA, fi and respectively supplies these control signals to sensors 520, 530, 540, 550.

Figure 14:
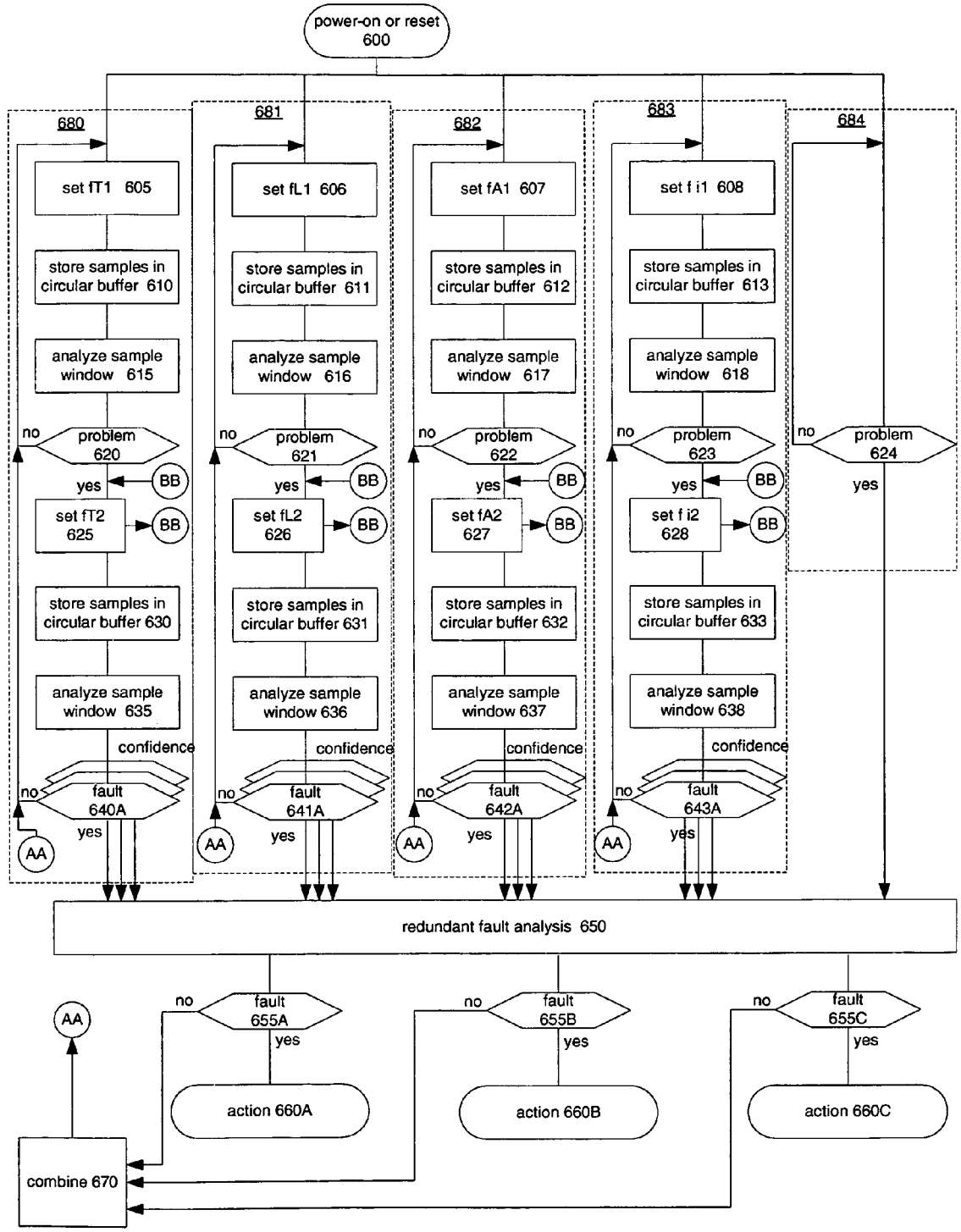
FIG. 14 is a flowchart for the circuit of FIG. 13.

FIG. 14 is a flowchart for the operation of microprocessor 570 of FIG. 13.

At step 600, microprocessor 570 is turned on, such as by receiving power, or is reset by a reset button (not shown) in the receptacle or plug-in retrofit device containing circuit 500.

Microprocessor 570 then simultaneously executes five processes 680-684 respectively corresponding to sensors 520, 530, 540, 550, 560. Processes 680-684 supply problem signals to fault analysis step 650 that determines whether to take one or more of a variety of actions, such as interrupting the line current, activating/de-activating status light(s) 580, activating/de-activating siren 585, sending a message to controller 20 and so on.

Process 680 will now be described. Process 680 includes steps 605, 610, 615, 620, 625, 630, 635, 640A-640C.

At step 605, microprocessor 570 sets sampling frequency control signal fT to a first value fT1, such as 100 Hz, and supplies control signal fT to temperature sensor 520.

At step 610, microprocessor 570 receives values from ADC 522 at the rate determined by signal fT, in this example, 100 samples per second, and stores them in an internal circular buffer or storage such that only the most recent values are stored. For example, if the buffer size is 1000 samples, then the most recent 10 seconds of sensed values are stored.

At step 615, which occurs periodically such as every 30 seconds, microprocessor 570 analyzes the stored values to produce an analysis result.

Figure 15:
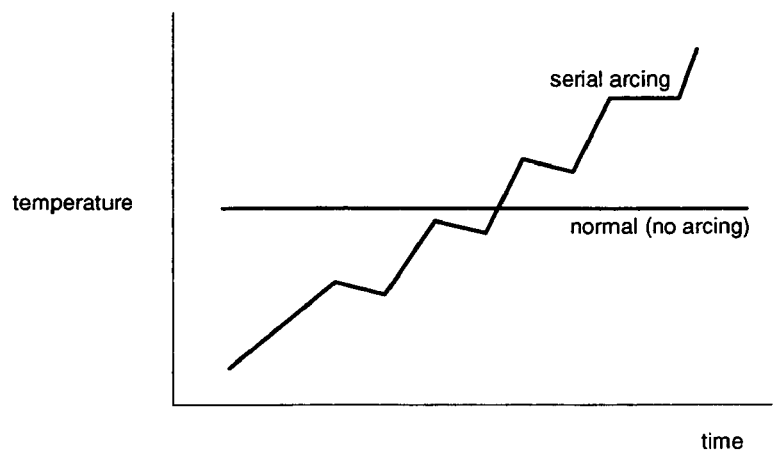
FIG. 15 shows temperature vs. time curves for normal operation and serial arcing.

The analysis at step 615 analyzes the sensed temperature signals in view of the type of problem being detected to produce a confidence estimate of the problem. For example, when the problem being detected is serial arcing, the temperature in the area surrounding the arcing characteristically rises in a slanted sawtooth curve, as shown in FIG. 15.

Serial arcing is typically found in outlets which have aging wire connections and/or degraded joints. The serial arcing is caused mainly by intermittent contact due to rusted wire and/or rusted screw and/or degraded junction which causes accelerated failure of connection. Once serial arcing begins, the connection continues to degrade until it becomes hazardous because of the resulting sharp temperature rise when a load is applied to the outlet. The temperature can rise to over 200° C. is 10 seconds for a continuous serial arcing connection.

The problem analysis at step 615 tries to detect a rising temperature in the sampled data, as follows.

Let

T0 be the oldest data sample in the circular buffer,

Tn be the most recent data sample in the circular buffer, and

Tavg be the average value of all samples in the circular buffer.

If $$(Tn-T0>Tavg*0.1)$$

then the samples probably are characteristic of a rising temperature and hence serial arcing may be occurring. Other specific tests or values will be apparent to those of ordinary skill in the art; an important feature of the test is that it is to detect the behavior expected to be found when the problem occurs.

At step 620, microprocessor 570 determines whether the analysis result produced at step 615 indicates there is a problem. If not, processing returns to step 605. If there is a problem, processing proceeds to step 625.

At step 625, which occurs if a fault is determined at step 620 or can also occur if problem signal BB is received, microprocessor 570 sets sampling frequency control signal fT to a second value fT2 that is higher than the first value fT1, such as fT2=1000 Hz, and supplies control signal fT to temperature sensor 520. Microprocessor 570 also generates problem signal BB and supplies it to steps 626, 627, 628 of processes 681, 682, 683.

It will be appreciated that, in this manner, when any of sensors 520, 530, 540, 550 generates data indicating a possible fault, all of the sensors then begin to sample at a higher frequency, enabling analysis in a more time-granular fashion. That is, when things appear normal, a first lower sampling rate is used to reduce power consumption, while when a possible fault occurs, a second higher sampling rate is used despite the higher power consumption to enable detection of transient faults. In embodiments where power consumption is not a concern, the second higher sampling rate may be used constantly.

At step 630, microprocessor 570 receives data from ADC 522 at the higher rate, in this example, 1000 samples per second, and stores them its internal circular buffer or storage such that only the most recent values are stored. For example, if the buffer size is 1000 samples, then the most recent 1000 milliseconds of sensed data are stored.

At step 635, which occurs periodically such as every 500 milliseconds or every 100 milliseconds or every 2 seconds, microprocessor 570 analyzes the stored values to produce an analysis result. The analysis at step 635 is similar to the analysis at step 615 but occurs with more temporal granularity due to the higher sampling rate, and instead of a binary result (problem or normal), the result is a confidence estimate of whether a fault exists. Let 771 be the CONFIDENCE value for the temperature samples. An example analysis is:

If (Tn>2T0) then ($\eta_1$=1.00)
else if (Tavg<32° F.) then ($\eta_1$=0)
else if (32° F.<Tavg<150° F.) then ($\eta_1$=(Tn−T0)/T0)
else ($\eta_1$=0.97)

This analysis says that if the most recent temperature sample is twice the initial temperature sample, then there is definitely a problem (CONFIDENCE=100%). If the average temperature of the temperature samples in the circular buffer is at least 150° F., then the CONFIDENCE that there is a problem is 97%. While the average temperature is between 32° F. and 150° F., then the CONFIDENCE is the normalized temperature difference between the oldest and newest samples. If the average temperature is under 32° F., then there is definitely not a fault.

At step 640A, microprocessor 570 determines whether the analysis result produced at step 635 indicates there is a fault. If not, processing returns to step 605. If there is a fault, processing proceeds to step 650. Continuing with the above example, if $\eta_1$ is at least 0.5, then there is a problem.

It will be appreciated that the sensed temperature data can be analyzed in different ways to detect different types of fault s. As described above, the fault of serial arcing is considered. Other faults, such as appliance malfunctioning (the appliance is load 590) or fire hazard, may be considered by analyzing the sensed temperature values in different manner. In some embodiments, microprocessor 570 conducts multiple analyses on the sensed data, and thus has steps 640B, 640C and so on corresponding to the different types of fault analyses. In this embodiment, if one or more fault s are detected, processing proceeds to step 650, that is, only if no fault s are detected does processing return to step 605.

Process 681 includes steps 606, 611, 616, 621, 626, 631, 636, 641A-641C. Process 681 is similar to process 680, and for brevity, only differences will be discussed. When serial arcing occurs, the curve of light generated is similar to the curve of current, discussed below, and the light samples are analyzed similarly.

Process 682 includes steps 607, 612, 617, 622, 627, 632, 637, 642A-642C. Process 682 is similar to process 680, and for brevity, only differences will be discussed. When serial arcing occurs, the curve of sound generated is similar to the curve of current, discussed below.

Process 683 includes steps 608, 613, 618, 623, 628, 633, 638, 643A-643C. Process 683 is similar to process 680, and for brevity, only differences will be discussed.

Figure 16:
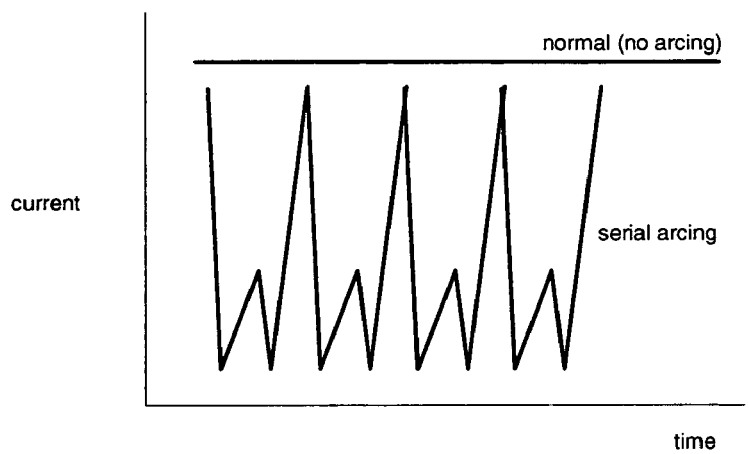
FIG. 16 shows current vs. time curves for normal operation and serial arcing.

FIG. 16 shows typical current vs. time curves for serial arcing and for normal current without arcing. The normal non-arcing current is basically flat with high frequency noise. In contrast, the serial arcing curve has a pronounced W-shaped period.

Figure 17:
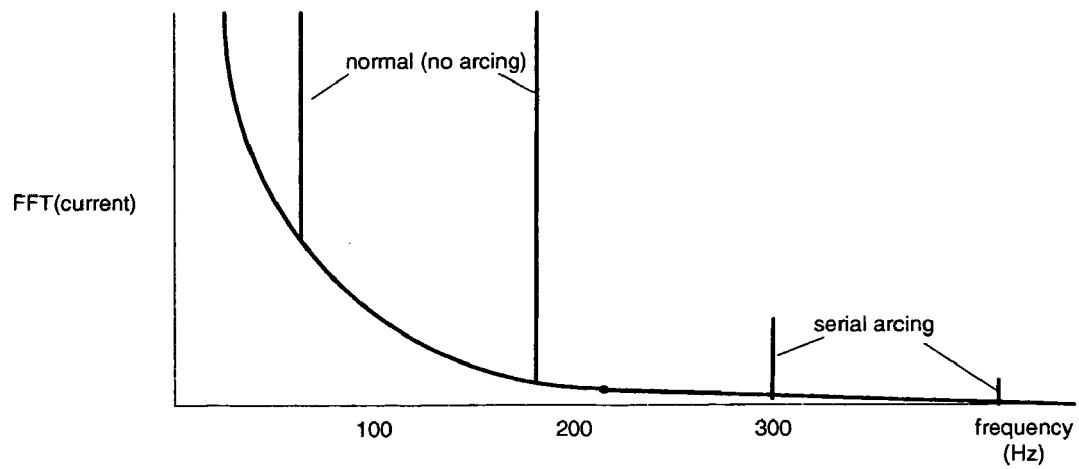
FIG. 17 shows FFT frequency spectra for normal operation and serial arcing.

FIG. 17 shows exemplary Fast Fourier Transform (FFT) spectra of the current vs. frequency curves for normal operation and serial arcing. The normal non-arcing FFT spectrum has a lot of energy in low frequencies and asymptotically decreasing energy in higher frequencies, with pronounced spikes at 60 Hz and 180 Hz. The serial arcing curve is similar but also has pronounced spikes at 300 Hz and 420 Hz. In different configurations, the spikes may occur at different frequencies, but there will be additional spikes in the arcing spectrum relative to the normal operation spectrum.

At step 618, a test corresponding to FIG. 16 is used. For the stored current samples in the circular buffer, the following values are determined:

Imin=the minimum value of the current samples
Imax=the maximum value of the current samples
Iavg=the average value of the current samples The test is:

If (Imin<0.95*Iavg) then serial arcing exists, else no serial arcing exists.

At step 638, a more elaborate version of a test corresponding to FIG. 16 is used. In other embodiments, other tests are used. Choose an upper bound βu, such as βu=0.3, and a lower bound βl, such as βl=0.03. The confidence value for the current samples is $\eta_4$, computed as:

$$\eta_4 = \left[\frac{(I\max - I\text{avg})/I\text{avg} - \beta l}{(\beta u - \beta l)}\right] * 0.5 + \left[\frac{(I\text{avg} - I\min)/I\text{avg} - \beta l}{(\beta u - \beta l)}\right] * 0.5$$

In another embodiment, at step 618, a test corresponding to FIG. 17 is used. The stored current samples in the circular buffer are subjected to a Fast Fourier Transform.

Let v=the magnitude of the frequency spectrum at an identified arcing frequency, such as 300 Hz.

Let Amax=a predetermined maximum value for the magnitude of the frequency spectrum at the identified arcing frequency.

Let Amin=a predetermined minimum value for the magnitude of the frequency spectrum at the identified arcing frequency.

The specific values of Amax and Amin are determined by the characteristics of the signals and arcing for specific loads and/or outlets.

The test is:

If (v>Amin) then serial arcing exists, else no serial arcing exists.

In another embodiment, at step 638, a more elaborate version of a test corresponding to FIG. 17 is used. The confidence value of a fault based on the current samples is $\eta_4$, computed as:

$$\eta_4 = \begin{cases} 0.5 * [(v - A\min)/(A\max - A\min)] + 0.4, & A\min < v < A\max \\ 0.95, & v \geq A\max \end{cases}$$

Process 684 includes step 624, wherein a ground fault trip signal from ground fault sensor 560, as digitized, is simply passed to step 650.

At step 650, triggered by arrival of a problem signal and then occurring for one or more subsequent periods to see if the problem has cleared, microprocessor 570 performs redundant fault analysis by combining the CONFIDENCE values of the problem signals, if any, from processes 680-684. A separate analysis is performed for each type of problem being considered. Additionally, if the ground fault trip signal indicates a ground fault, then the fault analysis immediately indicates a ground fault so that the current is interrupted to load 590.

In one embodiment, the fault confidence signals are combined as follows:

$$\eta_{fault} = 1 - \prod_{i=1}^{n}(1-\eta_i)$$

In this example, n=4 since the results of four sensors are provided at step 650.

$\eta_1$ corresponds to the CONFIDENCE of the sensed temperature from process 680.

$\eta_2$ corresponds to the CONFIDENCE of the sensed light from process 681.

$\eta_3$ corresponds to the CONFIDENCE of the sensed audio from process 682.

$\eta_4$ corresponds to the CONFIDENCE of the sensed current from process 683.

The confidence values $\eta_1, \eta_2, \eta_3, \eta_4$ are between 0.0 and 1.0.

In another embodiment, the problem signals are weighted; for instance, the sensed current may be deemed to be a better indicator than the sensed light, so the sensed current influences the outcome of the redundant fault analysis more than the sensed light.

For example, assume confidence values $\eta_1$=0.62, $\eta_2$=0.71, and $\eta_4$=0.82 are delivered to step 650; in this example, there does not seem to be an audio problem perhaps because of loud ambient noise so no value for $\eta_3$ is delivered to step 650, i.e., $\eta_3$=0. The values are combined as:

$$\begin{aligned}\eta_{fault} &= 1-(1-0.62)*(1-0.71)*(1-0)*(1-0.82)\\ &= 1-(.38)*(.29)*1*(.18)\\ &= 0.98\end{aligned}$$

Thus, using three samples increases the overall level of confidence dramatically. That is, a fault that manifests simultaneously in multiple domains, even if it is not so serious in each domain, gives rise to strong confidence that a problem truly exists. It is preferred to use at least three domains, that is, redundancy in two domains.

At step 655A, corresponding to the problem of serial arcing, microprocessor 570 determines what action, if any, it should take. If no action is to occur, processing continues at step 670. Otherwise, at step 660A, the action is taken. For example, microprocessor 570 may be programmed to with the following rule:

If ($\eta_{fault}$>0.98) then (set signal 511 to open switch 510 and make status light 580 red)
else if (0.95<$\eta_{fault}$<0.98) then (make status light 580 blinking and red)
else if (0.90<$\eta_{fault}$<0.95) then (make status light 580 red)
else if (0.70<$\eta_{fault}$<0.90) then (send an alert message to controller 20)

Other rules for actions will be apparent to those of ordinary skill.

At step 655B, corresponding to another fault such as appliance malfunction, microprocessor 570 determines what action, if any, it should take. If no action is to occur, processing continues at step 670. Otherwise, at step 660B, the action is taken. For example, microprocessor 570 may be programmed to with the following rule:

If ($\eta_{fault}$>0.95) then (activate siren 585)
else if (0.80<$\eta_{fault}$<0.95) then (send an alert message to controller 20)

Other actions will be apparent to those of ordinary skill. For example, if load 590 is an air-conditioner drawing too much current, the action may be to regulate the voltage or current and send an alert message to controller 20 to calibrate the air-conditioner as it is running inefficiently.

At step 655C, corresponding to another fault such as fire hazard, microprocessor 570 determines what action, if any, it should take. If no action is to occur, processing continues at step 670. Otherwise, at step 660C, the action is taken.

At step 670, if no faults are detected, then normality signal AA is generated and provided to processes 680-683 so that all processes return to a lower sampling rate.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of performing problem detection/prediction, diagnosis, and resolution within an electrical provision device while minimizing power consumption, said method comprising:

using a microprocessor with a memory to simultaneously set a low, power-saving sampling frequency for one or more sensor types, using said one or more sensors to sense one or more respective operating characteristics of the electrical current provision device at said low sampling frequency, storing recent readings of each of said one or more sensors in a buffer portion of said memory, periodically analyzing said readings in said buffer using said microprocessor, by comparing said readings in said buffer with an accepted normal range for each of said respective sensor readings, wherein each of said readings being within said range comprises normal operation and wherein at least one of said sensor readings exceeding said range comprises abnormal operation, instituting an event-triggered sampling frequency for each of said one or more sensors when said at least one sensor reading in said buffer exceeds said accepted normal range, said event-triggering sampling frequency being at a higher sampling frequency than said low, power-saving sampling frequency, storing said one or more sensor readings at said event-triggered sampling frequency in said buffer portion of said memory, frequently analyzing said event-triggered readings in said buffer, said frequent analyzing comprising determining a confidence value, for said at least one sensor, indicating an amount of confidence that a fault exists, said frequent analyzing of said event triggered sensor readings occurring at a frequency being greater than said periodic analyzing of said sensor readings, performing a redundant fault analysis, when said at least one abnormal sensor reading persists for two or more occurrences of said frequent analyzing of said event-triggered readings, said redundant fault analysis comprising a combined confidence value for at least two sensors, taking a control action to resolve said existing fault, when said combined confidence value exceeds a predetermined threshold, by said microprocessor generating a control signal that is received by a controller, thereby causing said controller to command said control action, and generating a normality signal if said combined confidence value does not exceed said threshold, or if said abnormal sensor reading clears before said two or more occurrences of said frequent analyzing, said normality signal causing return to said low, power-saving sampling frequency.

2. The method of claim 1, wherein each of said one or more operating characteristics is one of temperature, humidity, light, sound, vibration, voltage, power, and line current.

3. The method of claim 1, wherein said fault is one of serial arcing, appliance malfunction, and fire hazard.

4. The method of claim 1, wherein said control action comprises one or more of sending, by said processor, a control signal for commanded control action by said controller in response to instructions entered locally on an input device or instructions received remotely over the internet; and sending, by said processor, a control signal for a predetermined control action, said predetermined control action comprising one or more of:
(a) preventing line current from flowing in the electrical current provision device,
(b) activating a status light,
(c) activating a sound generator, and
(d) sending a message to a controller.

5. The method of claim 1, wherein said at least two sensors have confidence values of $\eta_1, \ldots, \eta_n$, and wherein said combined confidence value, $\eta_{fault}$, is given by the equation:

$$\eta_{fault} = 1 - \prod_{i=1}^{n}(1 - \eta_i).$$

6. The method of claim 5, wherein when said at least two sensors comprises two sensors, $\eta_1$ corresponds to a confidence value of a fault from a temperature reading sensed from a first sensor, and $\eta_2$ corresponds to a confidence value of a fault from a light reading sensed from a second sensor.

7. The method of claim 6 wherein when said at least two sensors comprises a third sensor, $\eta_3$, corresponds to a confidence value of a fault from an audio reading sensed from said third sensor.

8. The method of claim 7, wherein when said at least two sensors comprises a fourth sensor, $\eta_4$ corresponds to a confidence value of a fault from a current reading sensed from said fourth sensor.

9. The method of claim 4 further comprising instructing said processor to ignore said at least one sensor reading in said buffer that exceeds said accepted normal range; and adjusting said accepted normal range to be a new normal range that include said abnormal sensor reading, when regularly commanded to ignore said abnormal sensor reading.

10. The method of claim 9, wherein commanding said processor to ignore said abnormal sensor reading regularly comprises commanding said processor to ignore said abnormal sensor reading at least three times.

11. The method of claim 1, wherein said low, power-saving sampling frequency comprises sampling at approximately 100 Hz; and wherein said higher event-triggered sampling frequency comprises sampling at approximately 1000 Hz.

12. The method of claim 11, wherein said periodically analyzing comprises analyzing approximately every 10-30 seconds; and wherein said frequently analyzing comprises analyzing in the range of approximately every 500 milliseconds to approximately every 2 seconds.

13. The method of claim 1, wherein said one or more sensor types comprise one or more of a photodiode or camera for sensing light; a 2-axis accelerometer for sensing vibrations; a microphone for sensing sound; a thermocouple or infrared imager for sensing temperature; a Hall-effect sensor for sensing current.

14. The method of claim 1 wherein said storing recent readings in said buffer portion of said memory comprises storing said one or more sensor readings until completing said periodic analyzing using said readings.

15. The method of claim 14 wherein said periodic analyzing of said recent sensor readings for serial arcing comprises:

determining a minimum current value, $I_{min}$, of said recent current sensor readings;

determining a maximum current value, $I_{max}$, of said recent current sensor readings determining an average current value, $I_{avg}$ of said recent current sensor readings; and wherein said at least one sensor reading exceeding said accepted normal range is where $I_{min} < 0.95(I_{avg})$.

16. The method of claim 15, wherein said confidence value of said frequent analyzing of said event-triggered current readings comprises:

$$\eta = \left[\frac{(Imax - Iavg)/Iavg - \beta l}{(\beta u - \beta l)}\right] * 0.5 + \left[\frac{(Iavg - Imin)/Iavg - \beta l}{(\beta u - \beta l)}\right] * 0.5$$

where $\beta_u$ is an upper bound, and $\beta_l$ is a lower bound, and wherein $\beta_u$ is approximately 0.3 and $\beta_l$ is approximately 0.03.

17. A method of performing intelligent problem detection/prediction, diagnosis, and resolution within an electrical current provision device, said method comprising:

using one or more sensors to detect a possible problem, each of said one or more sensors sensing an operating characteristic of one or more components of said electrical current provision device at a first sampling rate, said first rate being a power-saving sampling rate;

comparing a present sensor reading of each of said one or more sensors with an acceptable range for said respective sensor reading;

wherein when said present sensor reading is within said acceptable range, storing said present sensor reading in a controller;

wherein when at least one of said present sensor readings is outside said acceptable range indicating detection of a possible problem, instituting an event-triggered sampling rate for said one or more sensors, said event-triggering sampling rate being at a higher frequency than said first sampling rate, analyzing said event triggered readings to produce a confidence estimate to diagnose whether the problem is a fault, taking a control action, by a processor, to resolve said fault when said confidence estimate exceeds a predetermined threshold, and returning said one or more sensors to sensing at said first sampling rate when said at least one sensor reading returns within said acceptable range.

18. The method of claim 17, wherein said operating characteristic is one of: temperature readings, humidity readings, voltage readings, power readings, image readings, vibration readings, and acoustic readings.

19. The method of claim 18, wherein said fault is one of serial arcing, excessive energy consumption, appliance malfunction, and fire hazard.

20. The method of claim 19, wherein two or more sensors are used for sensing two or more operating characteristics; and wherein when at least one of said two or more operating characteristics sampled at said first sampling rate detects a possible problem, generating two or more confidence estimates using said event-triggered sampling rate, said two or more confidence estimates being $\eta_1, \ldots, \eta_n$.

21. The method of claim 20 further comprising improving an overall level of confidence of said fault by checking for abnormality in multiple domains by combining said two or more confidence estimates to generate a combined confidence estimate, $\eta_{fault}$, said combined confidence estimate is given by the equation:

$$\eta_{fault} = 1 - \prod_{i=1}^{n}(1-\eta_i).$$

22. The method of claim 21 further comprising one or more of:
(a) taking, by said processor, a commanded control action by responding to instructions entered locally on an input device or received remotely over the interne; and
(b) taking, by said processor, a predetermined control action, said predetermined control action comprising one or more of:
   (i) preventing line current from flowing in the electrical current provision device,
   (ii) activating a status light,
   (iii) activating a sound generator to generate an audible alarm, and
   (iv) sending a message to a personal computer or cell phone.

23. The method of claim 22 further comprising commanding said processor to ignore said present reading being outside said acceptable range; and adjusting said acceptable range to a new range to include said present reading, when regularly commanded to ignore said present reading.

24. The method of claim 23 wherein commanding said processor to ignore said present reading regularly comprises commanding said processor to ignore said present reading at least three times.

* * * * *